US 8,847,713 B2

(12) United States Patent
Niimi et al.

(10) Patent No.: US 8,847,713 B2
(45) Date of Patent: Sep. 30, 2014

(54) STARTER-USE ELECTROMAGNETIC SWITCH

(75) Inventors: Masami Niimi, Handa (JP); Takahisa Inagaki, Nishio (JP); Mitsuhiro Murata, Niwa-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/484,984

(22) Filed: May 31, 2012

(65) Prior Publication Data

US 2013/0027157 A1    Jan. 31, 2013

(30) Foreign Application Priority Data

Jul. 27, 2011  (JP) .................................. 2011-163877

(51) Int. Cl.
| | | |
|---|---|---|
| H01H 67/02 | (2006.01) | |
| H01H 50/44 | (2006.01) | |
| F02N 11/08 | (2006.01) | |
| H01H 51/06 | (2006.01) | |

(52) U.S. Cl.
CPC ........... *F02N 11/087* (2013.01); *H01H 50/443* (2013.01); *F02N 11/0814* (2013.01); *H01H 51/065* (2013.01)
USPC ....................................................... 335/126

(58) Field of Classification Search
USPC ....................................................... 335/126
See application file for complete search history.

(56) References Cited

U.S. PATENT DOCUMENTS

| | | | | |
|---|---|---|---|---|
| 7,948,338 | B2* | 5/2011 | Niimi et al. .................... | 335/126 |
| 8,212,637 | B2* | 7/2012 | Kurasawa ...................... | 335/126 |
| 8,531,258 | B2* | 9/2013 | Niimi et al. .................... | 335/126 |
| 2008/0122564 | A1 | 5/2008 | Utsunomiya et al. | |
| 2009/0206965 | A1 | 8/2009 | Niimi | |
| 2010/0059007 | A1* | 3/2010 | Senda et al. ................ | 123/179.4 |
| 2010/0251852 | A1* | 10/2010 | Murata et al. .................... | 74/7 A |
| 2010/0264670 | A1* | 10/2010 | Usami et al. ................ | 290/38 R |
| 2011/0095852 | A1* | 4/2011 | Niimi et al. ..................... | 335/184 |
| 2011/0140813 | A1* | 6/2011 | Suzuki et al. ................... | 335/156 |
| 2011/0187127 | A1* | 8/2011 | Murata et al. ................ | 290/38 C |
| 2012/0162847 | A1* | 6/2012 | Suzuki et al. ................... | 361/206 |

FOREIGN PATENT DOCUMENTS

| | | |
|---|---|---|
| CN | 102290286 A | 12/2011 |
| JP | A-2008-135344 | 6/2008 |
| JP | A-2010-225596 | 10/2010 |

OTHER PUBLICATIONS

May 19, 2014 Office Action issued in Chinese Patent Application No. 201210265564.9 (with English Translation).

* cited by examiner

*Primary Examiner* — Mohamad Musleh
(74) *Attorney, Agent, or Firm* — Oliff PLC (57) ABSTRACT

The starter-use electromagnetic switch has an electrical contact interposed in a power supply line for supplying power from a battery to a starter motor, the main contact being turned on and off in interlock with energization of an electromagnet implemented by an excitation coil. The electromagnetic switch includes a connection fitting connected to the excitation coil at one end thereof and drawn outside through a resin cover of the electromagnetic switch at the other end thereof, and a terminal fitting electrically and mechanically connected to the other end of the connection fitting at one end thereof, the other end of the terminal fitting being branched into first and second terminal pieces. The first terminal piece serves as an excitation terminal supplied with power from the battery. The second terminal piece serves as a connection terminal connected to an excitation terminal of an external electromagnetic switch through a cable.

14 Claims, 8 Drawing Sheets

FIG.8

STARTER-USE ELECTROMAGNETIC SWITCH

This application claims priority to Japanese Patent Application No. 2011-163877 filed on Jul. 27, 2011, the entire contents of which are hereby incorporated by reference.

BACKGROUND OF THE INVENTION

1. Field of the Invention

The present disclosure relates to a starter-use electromagnetic switch.

2. Description of Related Art

Japanese Patent Application Laid-open No. 2008-135344 describes a terminal structure of an electromagnetic switch mounted on a starter. This terminal structure includes an excitation terminal having a plate-like shape and insert-molded in a resin cover, and a connection terminal for electrical connection between the excitation terminal and an excitation coil. A terminal guide section having a tubular shape is provided integrally with the resin cover surrounding the excitation terminal drawn outside penetrating through the resin cover. According to the above terminal structure, the electromagnetic switch can be provided with waterproofness by adapting the shape of the terminal guide section to the shape of a connector of external wires connected to the excitation terminal, and using a sealing member such as a gum seal.

Meanwhile, providing a vehicle with an idling stop system is recognized as one means for CO2 emission reduction. The idling stop system operates to automatically stop an engine of the vehicle by cutting fuel supply to the engine when the vehicle is stopped at an intersection for a red light, or stopped due to traffic jam, for example. However, since the engine idling stop system frequently stops and restarts the engine, usage frequency of the starter is considerably higher for vehicles provided with the idling stop system compared to vehicles not provided with the idling stop system. When an engine is cranked by a starter, a battery voltage momentarily drops considerably because a large current called a rush current flows into a motor of the starter. Accordingly, it may occur that a phenomenon called "instantaneous interruption" in which electric or electronic devices such as a meter, an audio device, and a car navigation system stop operation momentarily when an engine is started by a starter. Hence, a driver or a user of a vehicle provided with the idling stop system may feel uncomfortable each time the engine of the vehicle is restarted by the idling stop system.

Japanese Patent Application Laid-open No. 2010-225596 filed by the applicant of the present invention describes a starter including an auxiliary electromagnetic switch which operates to suppress an inrush current flowing into a motor of a starter in order to prevent the above instantaneous interruption. This auxiliary electromagnetic switch incorporates a resistor interposed in a power supply line for supplying power from a battery to the motor, and is configured to switch between a first current path for passing a current to the motor through the resistor and a second current path for passing a current to the motor bypassing the resistor in interlock with on/off of an electromagnet of the auxiliary electromagnetic switch. Incidentally, although an auxiliary electromagnetic switch included in the starter described in the former patent document (Japanese Patent Application Laid-open No. 2008-135344) is fixed to a starter housing through a bracket, the auxiliary electromagnetic switch does not necessarily have to be mounted on the starter, and it may be disposed near the starter.

However, it is necessary for a vehicle to supply power to the excitation terminal of each of the electromagnetic switch and the auxiliary electromagnetic switch regardless of whether the auxiliary electromagnetic switch is mounted on the starter, or disposed near the starter. Accordingly, since it is necessary to connect cables to the electromagnetic switch and the auxiliary electromagnetic switch separately after the starter is mounted on the vehicle, cable connection work may become difficult due to limited space. If it is possible to connect a cable between the excitation terminal of the electromagnetic switch and the excitation terminal of the auxiliary electromagnetic switch before the starter is mounted on the vehicle, cable connection work is as easy as the case where the starter does not include the auxiliary electromagnetic switch.

However, as described in the former patent document, since only one of the excitation terminal pieces projects from the resin cover, it is impossible to connect a cable between the excitation terminal of the electromagnetic switch and the excitation terminal of the auxiliary electromagnetic switch in advance. To enable cable connection between the excitation terminal of the electromagnetic switch and the excitation terminal of the auxiliary electromagnetic switch, it is necessary to provide an additional metal fitting and provide the terminal structure with waterproofness.

SUMMARY

An exemplary embodiment provides a starter-use electromagnetic switch having an electrical contact interposed in a power supply line for supplying power from a battery to a motor of a starter, the main contact being turned on and off in interlock with energization and deenergization of an electromagnet implemented by an excitation coil of the starter-use electromagnetic switch, including:

a connection fitting electrically connected to the excitation coil at one end thereof, and drawn outside through a resin cover of the starter-use electromagnetic switch at the other end thereof; and a terminal fitting electrically and mechanically connected to the other end of the connection fitting at one end thereof, the other end of the terminal fitting being branched into first and second terminal pieces, the first terminal piece serving as an excitation terminal supplied with power from the battery through the power supply line, the second terminal piece being used as a connection terminal connected to an excitation terminal of an external electromagnetic switch through a cable.

Another exemplary embodiment provides a starter-use electromagnetic switch having a first solenoid having a first excitation coil for pushing out a pinion of a starter toward a ring gear of an engine using an attraction force of a first electromagnet implemented by the first excitation coil, and a second solenoid having a main contact interposed in power supply line for supplying power from a battery to a motor of a starter and a second excitation coil for interrupting a current supplied to the motor through the power supply line by opening and closing the main contact in interlock of on/off of a second electromagnet implemented by the second excitation coil, including:

a first connection fitting electrically connected to the first excitation coil at one end thereof and drawn outside through the resin cover at the other end thereof;

a second connection fitting electrically connected to the second excitation coil at one end thereof, and drawn outside through a resin cover of the starter-use electromagnetic switch at the other end thereof;

a first terminal fitting electrically and mechanically connected to the other end of the first connection fitting at one end thereof, the other end thereof serving as a first excitation coil supplied with power from the battery through a power feed line; and a second terminal fitting electrically and mechanically connected to the other end of the second fitting, and branched into first and second terminal pieces at the other end thereof, the first terminal piece serving as a second excitation terminal supplied with power from the battery through the power feed line, the second terminal piece serving as a connection terminal electrically connected through a cable to an excitation terminal of an auxiliary electromagnetic switch for suppressing a starting current flowing to the motor when the main contact is closed.

According to each of the exemplary embodiments, there is provide a starter-use electromagnetic switch having a terminal structure which enables connection with an another external electromagnetic switch using an ordinary cable without adding an additional member or machining a portion between excitation terminals of the starter-use electromagnetic switch and the external electromagnetic switch.

Other advantages and features of the invention will become apparent from the following description including the drawings and claims.

PREFERRED EMBODIMENTS OF THE INVENTION

In the following embodiments, the same or equivalent components or members are denoted by the same reference numerals or characters.

First Embodiment

Figure 3:
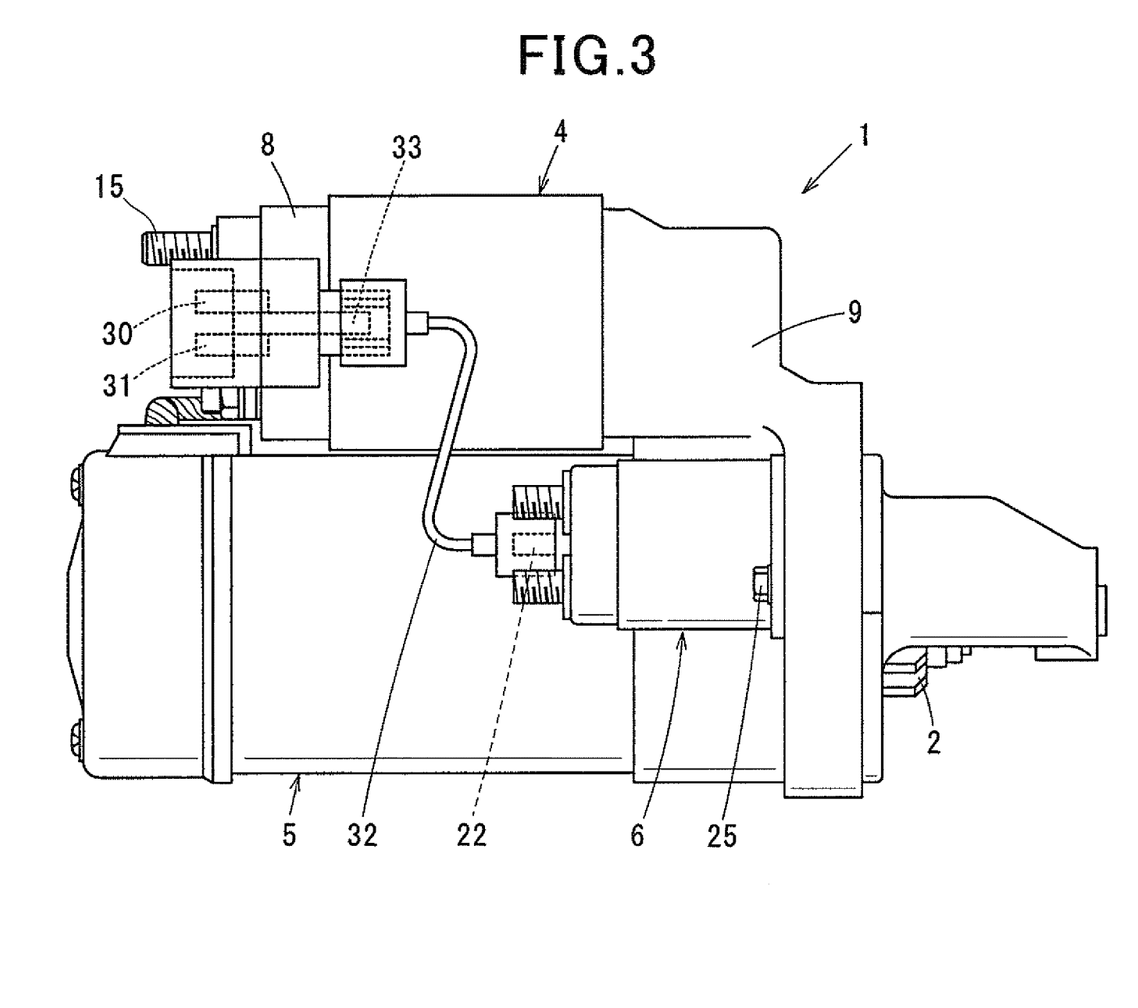
FIG. 3 is a side view of a starter on which the starter-use electromagnetic switch and an auxiliary electromagnetic switch are mounted.

As shown in FIG. 3, a starter 1 including a starter-use electromagnetic switch according to a first embodiment of the invention is of the type of pushing out a pinion 2 in the axial direction (rightward direction in FIG. 3) to cause the pinion 2 to mesh with a ring gear 3 (see FIG. 4) of an engine. The starter 1 includes, in addition to a main electromagnetic switch 4 as the starter-use electromagnetic switch, an auxiliary electromagnetic switch 6 for suppressing a starting current of a motor 5. The main electromagnetic switch 4 includes a switch frame 7 (see FIG. 1B) which has an annular bottom located on one end side thereof in the axial direction (the right end side in FIG. 3) and opens at the other end thereof, a solenoid unit (to be explained later) which uses the switch frame 7 as a common magnetic path, and a resin cover 8 which closes the opening of the switch frame 7. The switch frame 7 is fixed to a starter housing 9 by two stud bolts (not shown) so as to abut against a mounting surface of the starter housing 9 at its bottom surface.

As show in FIG. 4, the solenoid unit includes a solenoid SL1 for pushing out the pinion 2, and a solenoid SL2 for opening and closing a main contact (to be explained later) interrupting a current supplied to the motor 5. The solenoid SL1 includes a first excitation coil 11 serving as an electromagnet when supplied with a current from a battery 10. The solenoid SL2 includes a second excitation coil 12 serving as an electromagnet when supplied with a current from the battery 10. The first and second excitation coils 11 and 12 are disposed in tandem in the axial direction, and share a common fixed core (not shown) located therebetween. A first plunger 13 is disposed inside the first excitation coil 11 opposing one end surface of the fixed core so as to be movable in the axial direction. A second plunger 14 is disposed inside the second excitation coil 12 opposing the other end surface of the fixed core so as to be movable in the axial direction.

Figure 1A:
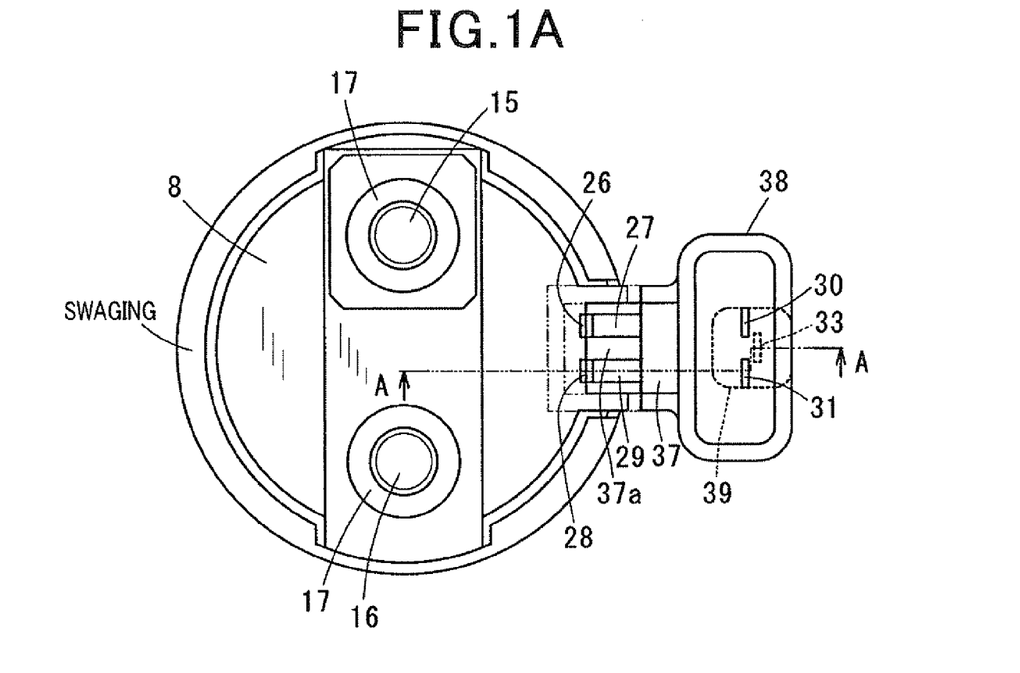
FIG. 1A is an axial plan view of a starter-use electromagnetic switch according to a first embodiment of the invention as viewed from the side of its resin cover.
Figure 1B:
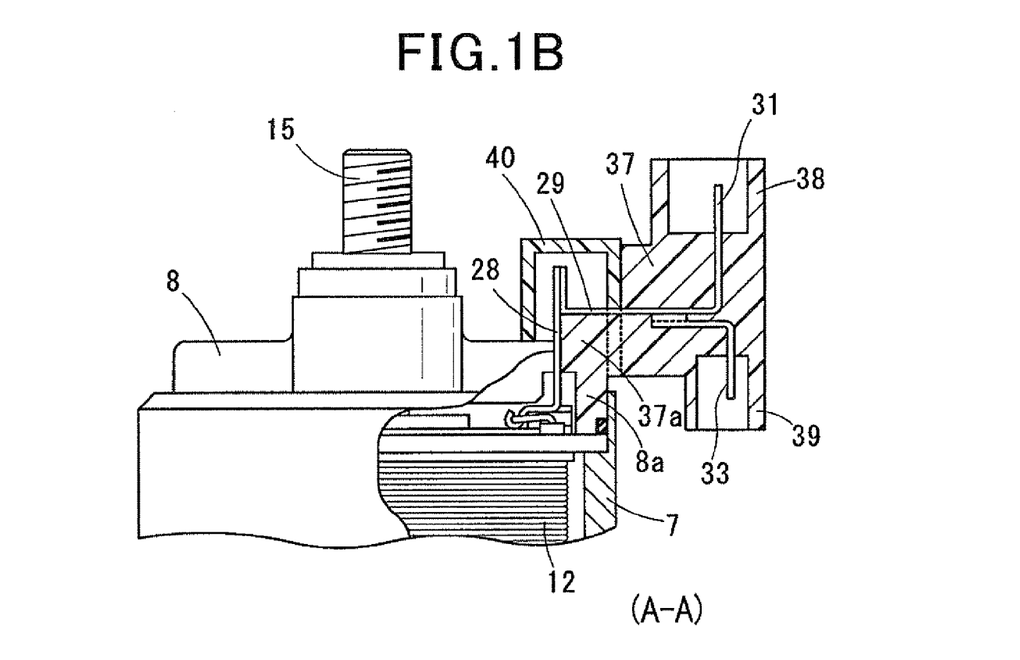
FIG. 1B is a cross-sectional view of FIG. 1A taken along line A-A.
Figure 2:
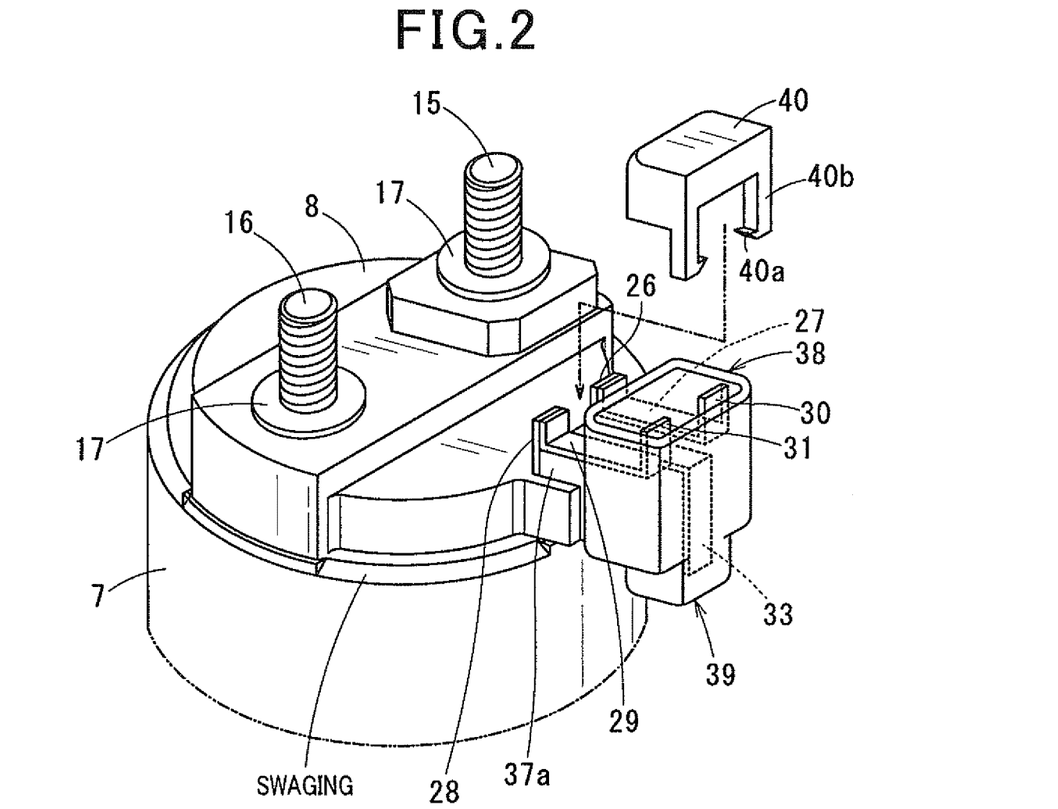
FIG. 2 is a perspective view of the resin cover shown in FIG. 1A.

As shown in FIG. 1B, the resin cover 8 includes a body section 8a having a shape of a bottomed cylinder. The front end portion of the body section 8a is inserted inside the switch frame 7 so as to close the opening of the switch frame 7. The resin cover 8 is fixed to the switch frame 7 by swaging the opening edge portion of the switch frame 7 against a step portion formed in the outer periphery of the resin cover 8. As shown in FIG. 2, the resin cover 8 is attached with two terminal bolts 15 and 16 connected to a power supply line for supplying power from a battery 10 to the motor 5, and a later-described switch terminal. The terminal bolt 15 is a B-terminal bolt connected to the high-voltage side (the battery 10 side) of the power supply line. The terminal bolt 16 is an M-terminal bolt connected to the low-voltage side of the power supply line. Each of the terminal bolts 15 and 16 is inserted into the resin cover 8 through a through hole formed in the resin cover 8, and fixed to the resin cover 8 by a washer 17.

Figure 4:
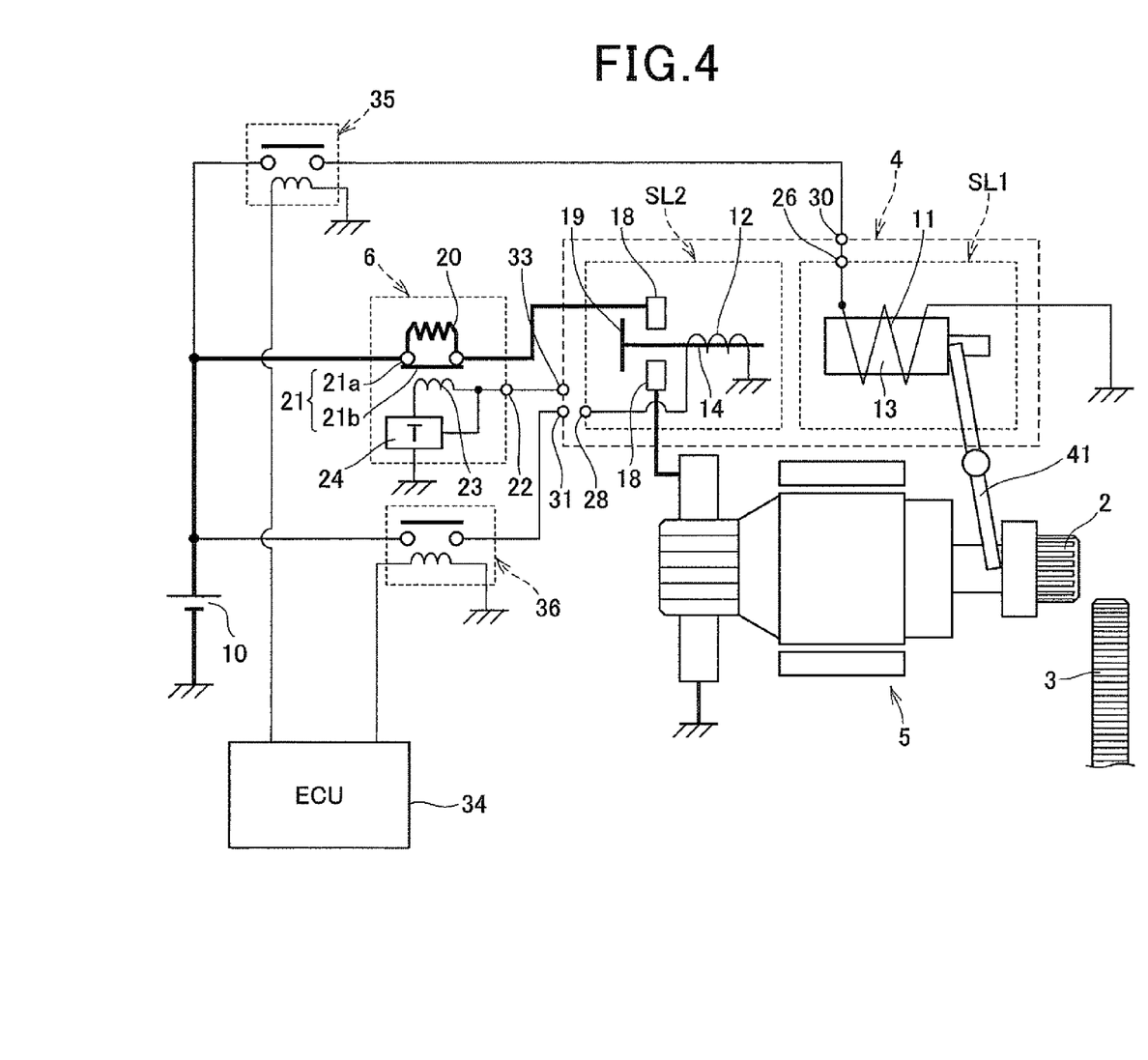
FIG. 4 is an electrical circuit diagram of the starter.

As shown in FIG. 4, a pair of fixed contacts 18 and a movable contact 19 constituting the main contact are disposed inside the resin cover 8. One of the fixed contacts 18 is formed separately from the terminal bolt 15, and electrically and mechanically connected to the terminal bolt 15. The other of the fixed contacts 18 is formed separately from the terminal bolt 16, and electrically and mechanically connected to the terminal bolt 16. Alternatively, the two fixed contacts 18 may be formed integrally with the terminal bolts 15 and 16, respectively. For example, the head portions of the terminal bolts 15 and 16 may be used as the fixed contacts 18. The movable contact 19 is supported by a resin-made shaft (not shown) fixed to the second plunger 14. The movable contact 19 makes and breaks electrical connection between the two fixed contacts 18 in interlock with movement of the second plunger 14. The main contact is closed when the movable contact 19 contacts with the fixed contacts 18 to make electrical continuity between the fixed contacts 18. The main contact is opened when the movable contact 19 moves away from the fixed contacts 18 to break electrical continuity between the fixed contacts 18.

As shown in FIG. 4, the auxiliary electromagnetic switch 6 includes a resistor 20 interposed in the power supply line at the upstream side (the battery 10 side) of the power supply line, an auxiliary contact 21 which short-circuits the resistor 20 when interposed in the power supply line, an excitation terminal 22 for receiving power from the battery 10, an excitation coil 23 serving as an electromagnet when energized, and a timer circuit 24 connected between the excitation coil 23 and the ground. The auxiliary electromagnetic switch 6 is for changing between a first current path through which a current flows to the motor 5 through the resistor 20 when the main contact is closed, and a second current path through which a current flows to the motor 5 bypassing the resistor 20 when the main contact is closed.

The auxiliary contact 21 includes a pair of fixed contacts 21*a* connected to both ends of the resistor 20, respectively, and a movable contact 21*b* movable with respect to the fixed contacts 21. The movable contact 21*b* makes and breaks electrical connection between the fixed contacts 21*a* in interlock with on/off of the electromagnet. The auxiliary electromagnetic switch 6 is of the normally-closed type, and accordingly, the auxiliary contact 21 is closed when the excitation coil 23 is deenergized. The timer circuit 24 is connected to the excitation terminal 22 through a wiring branched from a high-voltage side portion of the excitation coil 23. The timer circuit 24 turns on when power from the battery 10 is supplied to the excitation terminal 22, and turns off after elapse of a predetermined time (30 to 40 ms, for example) since then. That is, the auxiliary contact 21 is open only for the predetermined time during which the timer circuit 24 is on to energize the excitation coil 23.

As shown in FIG. 3, the auxiliary electromagnetic switch 6 can be fixed to the starter housing 9 by tightening a bolt 25. Alternatively, the auxiliary electromagnetic switch 6 may be fixed to the starter housing 9 by inserting a bracket between the main electromagnetic switch 4 and a mounting surface of the starter housing 9, tightening them to a stud bolt together, and fixing the electromagnetic switch 6 to the bracket by a bolt or welding. The auxiliary electromagnetic switch 6 may be disposed near the starter 1 instead of being mounted on the starter 1.

Next, the switch terminal is explained in detail. The switch terminal includes a first switch terminal for receiving power from the battery 10 to energize the first excitation coil 11, and a second switch terminal for receiving power from the battery 10 to energize the second excitation coil 12 and the excitation coil 23 of the auxiliary electromagnetic switch 6. The first switch terminal includes a blade type connection fitting 26 having a rectangular shape (referred to as the first connection fitting 26 hereinafter), and a first terminal fitting 27 electrically and mechanically connected to the first connection fitting 26. The second switch terminal includes a blade type connection fitting 28 having a rectangular shape (referred to as the second connection fitting 28 hereinafter), and a second terminal fitting 29 electrically and mechanically connected to the second connection fitting 28.

The first connection fitting 26, the first terminal fitting 27, the second connection fitting 28 and the second terminal fitting 29 can be manufactured by pressing a metal plate such as copper or brass plate. As shown in FIG. 1B, the first connection fitting 26 and the second connection fitting 28 are connected to the first excitation coil 11 and the second excitation coil 12 at their one ends, respectively, within the resin cover 8, and are drawn to the outside at their other ends in the axial direction through slit-like through holes formed in the resin cover 8. Although only the connecting portion between one coil end of the second excitation coil 12 and the second connection fitting 28 is shown in FIG. 1B, the connecting portion between one coil end of the first excitation coil 11 and the first connection fitting 26 is present in the back of FIG. 1B. As shown in FIGS. 1A and 2, the first and second connection fittings 26 and 28 are disposed side by side with a predetermined distance therebetween. In this embodiment, the predetermined distance is approximately equal to the width of the first and second connection fittings 26 and 28.

As shown in FIG. 2, the first terminal fitting 27 is bent into the shape of L at its one end portion. This one end portion of the first terminal fitting 27 and the other end portion of the first connection fitting 26 projecting from the resin cover 8 are butt-joint to each other by resistance welding, TIG welding, brazing, or soldering. The other end portion of the first terminal fitting 27 is bent into the shape of L in the same direction (the upward direction in FIG. 2) with its one end portion. The other end portion of the first terminal fitting 27 is used as the first excitation terminal 30 for receiving power from the battery 10 through a power feed line.

As shown in FIG. 2, the second terminal fitting 29 is bent into the shape of L at its one end portion. This one end portion of the second terminal fitting 29 and the other end portion of the second connection fitting 28 are butt-jointed to each other by resistance welding, TIG welding, brazing, or soldering. The other end portion of the second terminal fitting 29 is branched into a first terminal piece and a second terminal piece which are bent into the shape of L in the opposite directions with each other. That is, the first terminal piece is bent in the same direction (the upward direction in FIG. 2) with the one end portion of the second terminal fitting 29, and the second terminal piece is bent in the opposite direction (the downward direction in FIG. 2) with the first terminal piece.

The first terminal piece is used as a second excitation terminal 31 for receiving power from the battery 10 through the power feed line. As shown in FIG. 3, the second terminal piece is used as a connection terminal 33 connected to the excitation terminal 22 provided in the auxiliary electromagnetic switch 6 through a cable 32. The thickness of the second excitation terminal 31 is the same as that of the connection terminal 33. However, the width of the second excitation terminal 31 is larger than that of the connection terminal 33. Accordingly, the cross-sectional area of the second excitation terminal 31 is larger than that of the connection terminal 33. As shown in FIG. 4, the power feed lines connected to the first excitation terminal 30 and the second excitation terminal 31, respectively, are interposed with a drive relay 35 and a drive relay 36, respectively, energization of which is controlled by an ECU 34 (to be explained later).

As shown in FIG. 1, the first terminal fitting 27 and the second terminal fitting 29 are insert-molded in a terminal fixing block 37 integrally formed in the resin cover 8. The terminal fixing block 37 is formed so as to project outside in the radial direction perpendicular to the axial direction of the resin cover 8. The terminal fixing block 37 is provided with a terminal guide section 37*a* at its radially inner side, that is, at the side of the resin cover 8, which has a step portion projecting in the axial direction from the axial end surface of the resin cover 8. In the following, the axially upper surface (the upper end surface in FIG. 1B) of the terminal guide section 37*a* is referred to as a guide upper surface, and the side surface (the right side surface in FIG. 1B) of the terminal guide section 37*a* perpendicular to the axial end surface of the resin cover 8, that is, the rising surface of the terminal guide section 37a is referred to as a guide side surface.

As shown in FIG. 1B, the first and second terminal fittings 27 and 29 insert-molded in the terminal fixing block 37 are supported by the guide upper surface at their one end portions projecting from the side surface of the terminal fixing block 37 perpendicular to the guide upper surface. These one end portions are bent at right angles in the direction opposite to the guide side surface (in the upward direction in FIG. 1B). As shown in FIG. 2, the first and second excitation terminals 30 and 31 project upward from the terminal fixing block 37, and the connection terminal 33 projects downward from the terminal fixing block 37. On the other hand, the other end portions of the first connection fitting 26 and the second connection fitting 28 projecting from the resin cover 8 in the axial direction are supported by the guide side surface, and are connected to the one end portions of the first terminal fitting 27 and the second terminal fitting 29, respectively, at their ends projecting upward from the guide side surface.

As shown in FIGS. 1 and 2, a common connector housing 38 is formed integrally with the terminal fixing block 37 around the first and second excitation terminals 30 and 31 projecting upward from the terminal fixing block 37. Also, as shown in FIGS. 1 and 2, a connector housing 39 is formed integrally with the terminal fixing block 37 around the connection terminal 33 projecting downward from the terminal fixing block 37. The connector housing 39 is made smaller in the outer dimensions than the common connector housing 38. As shown, in FIG. 1A, the outer contour of the connector housing 39 shown by the broken line does not go out of the outer contour of the connector housing 38.

That is the outer contour of the connector housing 39 is inside the outer contour of the connector housing 38.

The connecting portion between the first connection fitting 26 and the first terminal fitting 27 and the connecting portion between the second connection fitting 28 and the second terminal fitting 29 are protected by a resin-made cap 40 shown in FIG. 2. The cap 40 wholly covers the portions of the first and second switch terminals each exposed outside, that is the other end portions of the first and second connection fittings 26 and 28 projecting outside from the axial end surface of the resin cover 8, and the one end portions of the first and second terminal fittings 27 and 29 projecting from the side surface of the terminal fixing block 37 perpendicular to the guide upper surface (see FIG. 1B). As shown in FIG. 2, the cap 40 is formed with two arm portions 40b each having an engaging claw 40a at its end. The arm portions 40b are fitted straddling both ends of the terminal fixing block 37a such that the engaging claws 40a engage with the corner portion of the back surface of the terminal fixing block 37. If an appropriate rubber-made sealing member is attached to the cap 40, it is possible for the cap 40 to have waterproofness.

Next, the operation of the starter 1 having the above described structure is explained. Activations of the solenoid SL1 for pushing out the pinion and the solenoid SL2 for supplying a current to the motor 5 of the main electromagnetic switch 4 can be controlled independently by the ECU 34. The ECU 34, which is an electronic control unit for idling stop control, receives an engine rotation signal, a transmission lever position signal, and a brake switch on/off signal from an engine ECU (not shown), and transmits an engine stop signal to the engine ECU upon determining that a stop condition to stop the engine has met based on these signals. The ECU 34 also transmits an engine restart request signal while outputting an ON signal to the drive relays 35 and 36 upon determining that an engine restart request has occurred when the driver of the vehicle has performed a some operation to start the vehicle (releasing of the brake pedal or shifting of the transmission lever to the drive range, for example) after the engine was stopped by the idling stop control.

In the following, the operation of the starter 1 when an engine restart request occurs after the engine was stopped by the idling stop control is explained. The ECU 34 outputs an ON signal to the drive relays 35 and 36 when an engine restart signal occurs. In response to the ON signal outputted from the ECU 34, the drive relay 35 turns on to supply power received from the battery 10 to the first excitation terminal 30, as a result of which the first excitation coil 11 is energized through the first connection fitting 26 connected to the first excitation terminal 30. As a result, the solenoid SL1 is energized so that the pinion 2 is pushed out by a shift lever 41 (see FIG. 4) to the opposite motor side, until the side surface of the pinion 2 abuts against the side surface of the ring gear 3, and stops there. Likewise, the drive relay 36 turns on in response to the ON signal outputted from the ECU 34, to supply power received from the battery 10 to the second excitation terminal 31, as a result of which the second excitation coil 12 is energized through the second connection fitting 28 connected to the second excitation terminal 31. As a result, the solenoid SL2 is energized to close the main contact.

Since the second excitation terminal 31 and the connection terminal 33 are formed as branches branched from the same metal plate (the second terminal fitting 29), when the second excitation terminal 31 receives power from the battery 10, the excitation terminal 22 of the auxiliary electromagnetic switch 6 is supplied with power from the connection terminal 33 through the cable 32. As a result, the timer circuit 24 connected to the excitation terminal 22 turns on to energize the excitation coil 23 causing the auxiliary contact to be opened by the attraction force of the electromagnet. When the auxiliary contact 21 is opened, the first current path through which a current flows from the battery 10 to the motor 5 by way of the resistor 20 is formed. Accordingly, since the current flowing to the motor 5 is suppressed by the resistor 20, the motor 5 rotates at a low speed, and the pinion 2 engages with the ring gear 3 by the rotation of the motor 5.

When a predetermined time has elapsed from the time when the timer circuit 24 turned on, the timer circuit 24 turns off to stop energization of the excitation coil 23. As a result, since the auxiliary contact is closed to short-circuit both ends of the resistor 20, the second current path bypassing the resistor 20 is formed. As a result, the current supplied from the battery 10 to the motor 5 is not suppressed by the resistor 20 any longer. Accordingly, since a current more than the current flowing through the first current path at the time of starting the motor 5 flows to the motor 5, the motor 5 rotates at a high speed. The rotation of the motor 5 is transmitted from the pinion 2 to the ring gear 3 to crank the engine.

The first embodiment described above provides the following advantages. The main electromagnetic switch 4 includes the second terminal fitting 29 the other end portion of which is branched into the first and second terminal pieces, the first terminal piece being used as the second excitation terminal 31 supplied with power from the battery 10, the second terminal piece being used as the connection terminal 33 connected to the excitation terminal 22 of the auxiliary electromagnetic switch 6 through the cable 32. According to this terminal structure, it is possible to perform cable connection between the main electromagnetic switch 4 and the auxiliary electromagnetic switch 6 beforehand.

That is, it is possible to connect the connection terminal 33 and the excitation terminal 22 of the auxiliary electromagnetic switch 6 to each other by the cable 32 as shown in FIG. 3 before mounting the starter 1 on the vehicle. Accordingly, since it is not necessary to connect a cable directly to the auxiliary electromagnetic switch 6 within the vehicle, but it is only necessary to connect a cable to the main electromagnetic switch 4 within the vehicle, workability of cable connection is greatly improved. Further, since it is not necessary to connect a cable to the auxiliary electromagnetic switch 6 within the vehicle, connecting a cable between the main electromagnetic switch 4 and the auxiliary electromagnetic switch 6 can be done with ease regardless of the position of the auxiliary electromagnetic switch 6 within the vehicle.

The second terminal fitting 29 constituting the second excitation terminal 31 is insert-molded in the terminal fixing block 37 integrally formed in the resin cover 8 together with the first terminal fitting 27. Accordingly, according to the first embodiment, a terminal structure highly resistant to vibration can be provided. The connection terminal 33 connected to the excitation terminal 22 of the auxiliary electromagnetic switch 6 through the cable 32 projects from the terminal fixing block 37 in the direction in which the starter 1 is mounted to the engine (the rightward direction in FIG. 3), which is different from the direction in which the second excitation terminal 31 projects from the terminal fixing block 37. On the other hand, since the auxiliary electromagnetic switch 6 is fixed to the starter housing 9, and the excitation to terminal 22 is provided projecting in the opposite-housing direction (the leftward direction in FIG. 3), it is possible to connect the connection terminal 33 and the excitation terminal 22 of the auxiliary electromagnetic switch 32 through the cable 32 by the most direct way. Accordingly, the interconnection resistance can be made small and the resistance to vibration can be made sufficiently high because the length of the cable can be made sufficiently short.

The connector housing 39 is formed around the connection terminal 33. Accordingly, the connection terminal 33 and the auxiliary electromagnetic switch 6 can be connected by the cable 32 which is attached with connectors at its both ends. This facilitates cable connection, and improves workability. The second terminal fitting 29 constituting the second excitation terminal 31 and the connection terminal 33 is formed such that the cross-sectional area of the second excitation terminal 31 is larger than that of the connection terminal 33. Accordingly, since more current can be passed to the second excitation terminal 31, a current sufficient for the auxiliary electromagnetic switch 6 to turn on can be passed reliably to the excitation terminal 22 connected to the connection terminal 33 by the cable 32.

The main electromagnetic switch 4 has such a shape that the outer contour of the connector housing 39 formed around the connection terminal 33 is within the outer contour of the connector housing 38 formed around the first and second excitation terminals 30 and 31 when the resin cover 8 is viewed from the axial direction. Accordingly, as shown in FIG. 1A, since the outer contour of the connector housing 39 does not go out of the outer contour of the connector housing 38, the profile area of the starter 1 as viewed from the axial direction can be made small. This facilitates mounting the starter 1 on the engine. Incidentally, although the whole outer contour of the connector housing 39 is within the outer contour of the connector housing 38 in this embodiment, these connector housings 38 and 39 may be formed such that their outer contours are partially overlapped.

The second terminal fitting 29 constituting the second excitation terminal 31 and the connection terminal 33 can be manufactured easily by pressing a metal plate. In the case where the second excitation terminal 31 and the connection terminal 33 are insert-molded in the terminal fixing block 37, and the connector housings 38 and 39 are formed integrally with this terminal fixing block 37, it is important to acquire position information of the second excitation terminal 31, the connection terminal 33 and the connector housings 38 and 39. In the first embodiment, since the second terminal fitting 29 is formed from a metal plate, it is possible to acquire reliable position information of the second excitation terminal 31 and the connection terminal 33. Accordingly, according to the first embodiment, a reliable terminal structure can be provided, because the connector housings 38 and 39 can be formed with high position accuracy.

Second Embodiment

Figure 5:
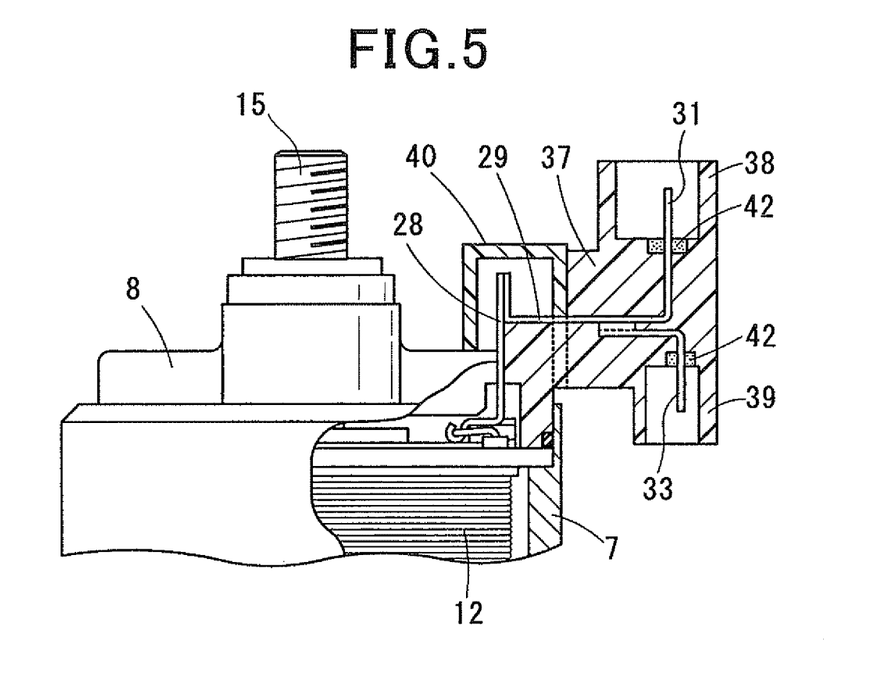
FIG. 5 is a cross-sectional view showing a terminal structure of a starter-use electromagnetic switch according to a second embodiment of the invention.

Next, a second embodiment of the invention is described. As shown in FIG. 5, the main electromagnetic switch 4 in the second embodiment has a structure in which a rubber-made seal member 42 is provided in each of the common connector housing 38 formed around the first and second excitation terminals 30 and 31, and the connector housing 39 formed around the connection terminal 33. The seal member 42 is embedded in the terminal fixing block 37 so as to fit in the root portions of the first and second excitation terminals 30 and 31 projecting upward from the terminal fixing block 37 and the connection terminal 33 projecting downward from the terminal fixing block 37. According to the second embodiment, since the portion between the first and second excitation terminals 30 and 31, and the portion between the connection terminal 33 and the terminal fixing block 37 are made liquid-tight, a further reliable terminal structure can be provided.

Third Embodiment

Figure 6:
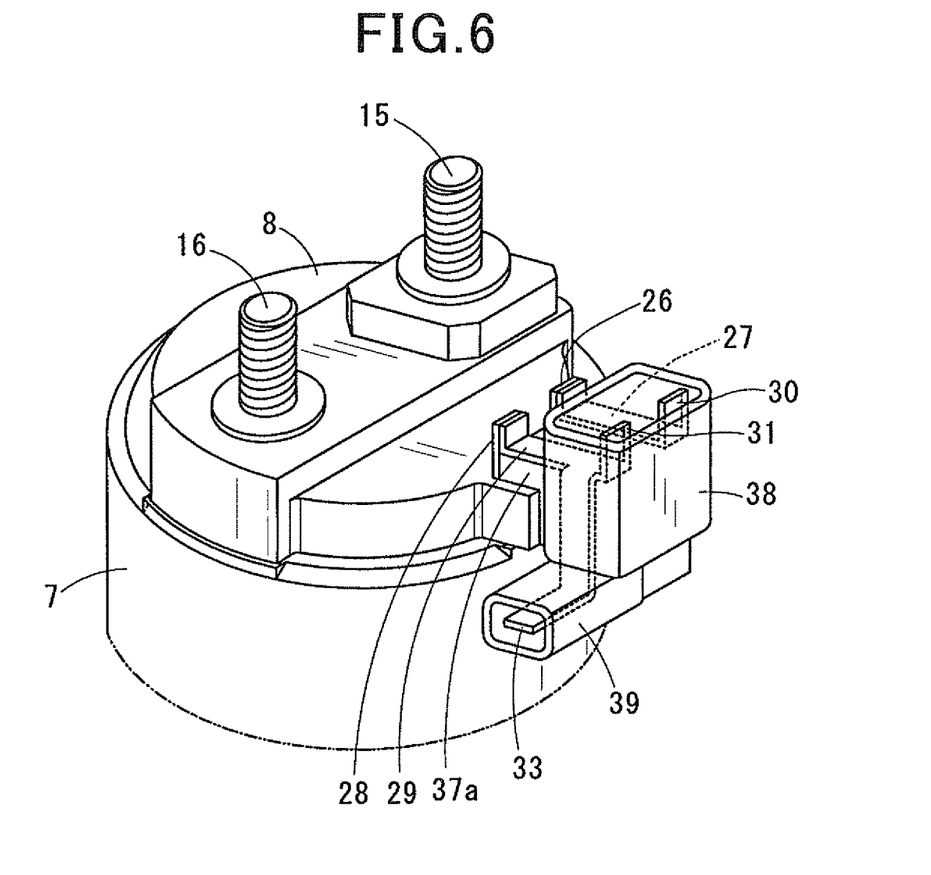
FIG. 6 is a perspective view showing a terminal structure of a starter-use electromagnetic switch according to a third embodiment of the invention.

Next, a third embodiment of the invention is described. In the first embodiment, the second excitation terminal 31 and the connection terminal 33 are disposed so as to project in axially opposite directions from the terminal fixing block 37. However, the directions in which the second excitation terminal 31 and the connection terminal 33 project may be changed depending on the mounting position of the auxiliary electromagnetic switch 6. FIG. 6 shows an example of such a change where the connection terminal 33 projects from the terminal fixing block 37 in a direction perpendicular to the axial direction (vertical direction in FIG. 6) of the main electromagnetic switch 4. According to this change, it is possible to connect a cable between the connection terminal 33 and the excitation terminal 22 of the auxiliary electromagnetic switch 6 by the most direct way depending on the mounting position of the auxiliary electromagnetic switch 6. Accordingly, according to the third embodiment, since the interconnection resistance can be made small, and the resistance to vibration can be made high because the length of the cable connected between the connection terminal 33 and the excitation terminal 22 of the auxiliary electromagnetic switch 6 can be made short.

Fourth Embodiment

Figure 7:
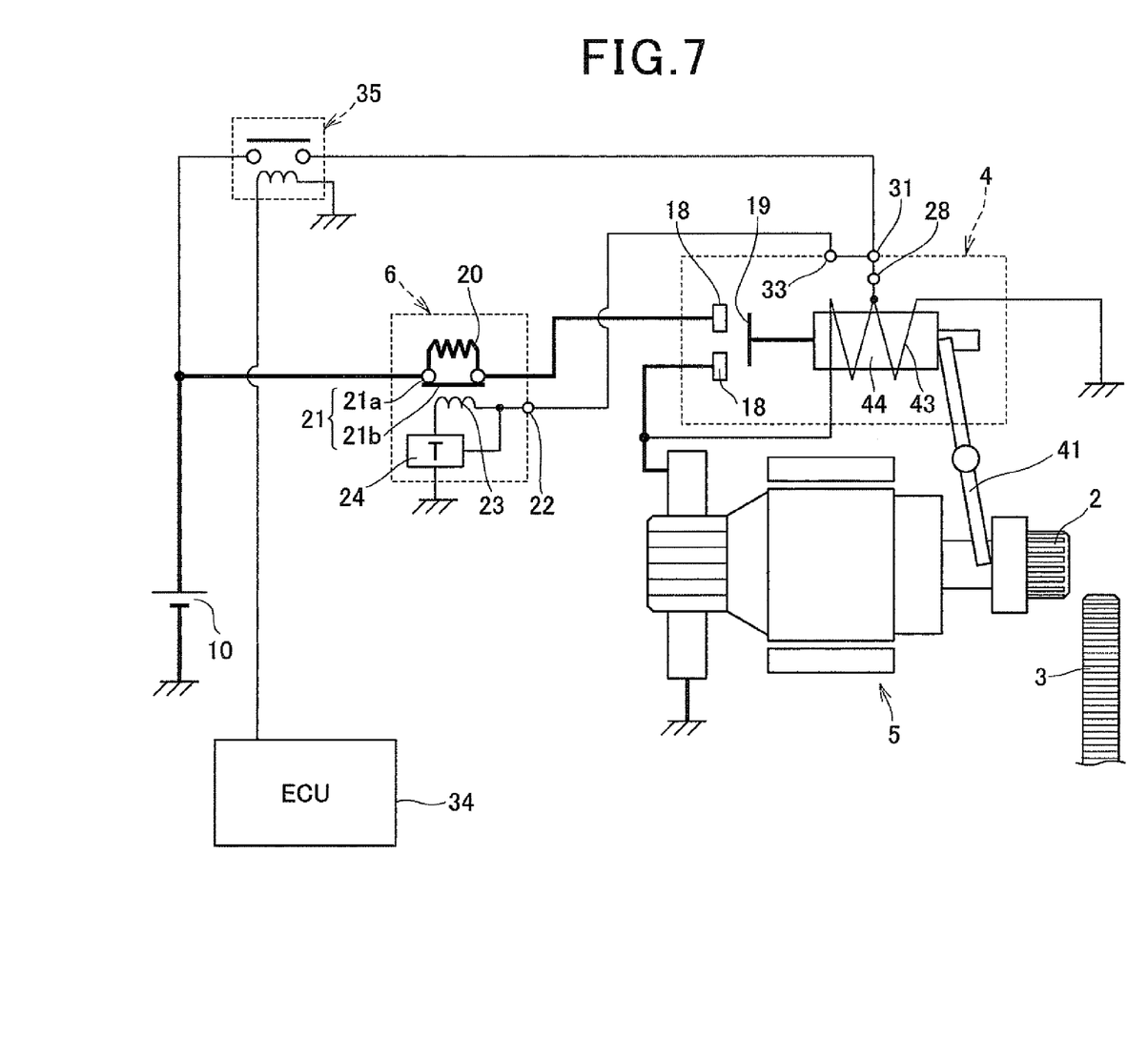
FIG. 7 is an electrical circuit diagram of a starter on which a starter-use electromagnetic switch according to a fourth embodiment of the invention is mounted.
Figure 8:
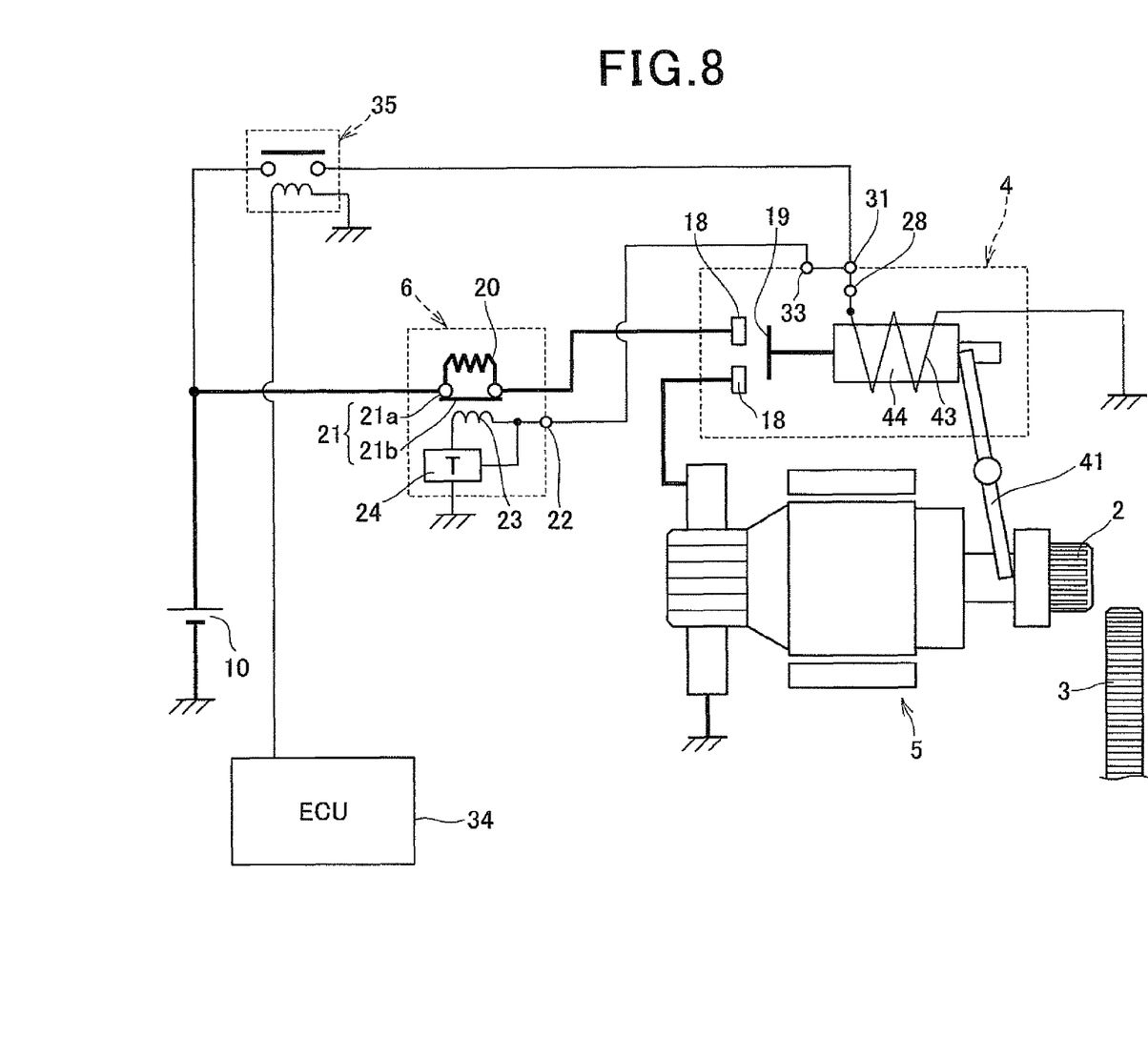
FIG. 8 is an electrical circuit diagram of a starter on which a modification of the starter-use electromagnetic switch according to the fourth embodiment of the invention is mounted.

Next, a fourth embodiment of the invention is described with reference to FIGS. 7 and 8. In the first embodiment, the main electromagnetic switch 4 includes the solenoid SL1 for pushing out the pinion 2 and the solenoid SL2 for interrupting a current supplied to the motor 5, so that energization of the solenoid SL2 and energization of the solenoid SL2 can be controlled independently. As shown in FIG. 7 or 8, in the fourth embodiment, the main electromagnetic switch 4 includes an excitation coil 43 and a plunger 44 movable in the axial direction inside the excitation coil 43, so that both pushing out of the plunger 2 and passing a current to the motor 5 are controlled in interlock with movement of the plunger 44.

Incidentally, the main electromagnetic switch 4 shown in FIG. 7 is of the dual coil type in which the excitation coil 43 is constituted of an attracting coil and a holding coil, while the main electromagnetic switch 4 shown in FIG. 8 is of the single coil type in which the excitation coil 43 is constituted of a single coil. The terminal structure in which the other end of the terminal fitting is branched into the first and second terminal pieces can be used for the starter of the fourth embodiment regardless of the main electromagnetic switch 4 being of the dual coil type or single coil type.

Other Embodiments

The auxiliary electromagnetic switch 6 used in the first embodiment is of the normally closed type in which the auxiliary contact 21 is closed when the excitation coil 23 is deenergized. However, the auxiliary electromagnetic switch 6 may be of the normally open type in which the auxiliary contact 21 is open when the excitation coil 23 is deenergized. In this case, a delay circuit is used instead of the timer circuit 24 described in the first embodiment. The delay circuit turns on after a predetermined time has elapsed since turning on of the main contact. That is, the delay circuit is off and the auxiliary contact 21 is open just when the main contact is turned on.

Accordingly, since the first current path through which a current flows from the battery 10 to the motor 5 by way of the resistor 20, the motor 5 rotates at a low speed 20 because the current is suppressed by the resistor 20 at this time.

Thereafter, when the delay circuit turns on, the excitation coil 23 is energized to serve as an electromagnet. As a result, since the second current path bypassing the resistor 20 is formed, a current not suppressed by the resistor 20 flows from the battery 10 to the motor 5, and accordingly the motor 5 rotates at a speed higher than the speed at which the motor 5 rotates initially.

In the first embodiment, the terminal structure (the structure that the other end portion of the terminal fitting is branched into the first and second terminal pieces) is applied to the main electromagnetic switch 4, and the connection terminal 33 and the excitation terminal 22 of the auxiliary electromagnetic switch 6 are connected to each other by the cable 32. Such a terminal structure can be applied to the auxiliary electromagnetic switch 6.

The above explained preferred embodiments are exemplary of the invention of the present application which is described solely by the claims appended below. It should be understood that modifications of the preferred embodiments may be made as would occur to one of skill in the art.

What is claimed is:

1. A starter-use electromagnetic switch including an electrical contact interposed in a power supply line for supplying power from a battery to a motor of a starter, the main contact being turned on and off in interlock with energization and deenergization of an electromagnet implemented by an excitation coil of the starter-use electromagnetic switch, comprising:
a connection fitting electrically connected to the excitation coil at one end thereof, and drawn outside through a resin cover of the starter-use electromagnetic switch at the other end thereof; and
a terminal fitting electrically and mechanically connected to the other end of the connection fitting at one end thereof, the other end of the terminal fitting being branched into first and second terminal pieces, the first terminal piece serving as an excitation terminal supplied with power from the battery through the power supply line,
the second terminal piece being used as a connection terminal connected to an excitation terminal of an external electromagnetic switch through a cable.

2. The starter-use electromagnetic switch according to claim 1, wherein the terminal fitting is insert-molded in a terminal fixing block integrally formed in the resin cover, and the first and second terminal pieces project from the terminal fixing block in different directions.

3. The starter-use electromagnetic switch according to claim 2, wherein a connector housing is formed integrally with the terminal fixing block around each of the first and second terminal pieces.

4. The starter-use electromagnetic switch according to claim 3, wherein
the first and second terminal pieces project from the terminal fixing block in opposite directions with respect to an axial direction of the starter, and
the connector housings provided around the first and second terminal pieces, respectively, overlap with each other in outer contour when viewed from the axial direction.

5. The starter-use electromagnetic switch according to claim 1, wherein
the starter-use electromagnetic switch is a main electromagnetic switch for interrupting a current supplied to the motor by opening and closing the electric contact, and
the external electromagnetic switch is an auxiliary electromagnetic switch for suppressing a starting current which flows to the motor when the electrical contact is closed by the main electromagnetic switch.

6. The starter-use electromagnetic switch according to claim 1, wherein
the starter-use electromagnetic switch is an auxiliary electromagnetic switch which includes a resistor interposed in the power supply line, and switches between a first current path for passing a current to the motor through the resistor and a second current path for passing a current to the motor bypassing the resistor by opening and closing the electrical contact, and
the external electromagnetic switch is a main electromagnetic switch which includes a main contact interposed in the power supply line, and interrupts a current supplied to the motor through the power supply line by closing an opening the main contact in interlock with on/off of an electromagnet thereof.

7. The starter-use electromagnetic switch according to claim 1, wherein the terminal fitting is formed by pressing a metal plate.

8. The starter-use electromagnetic switch according to claim 1, wherein the first terminal piece is larger in cross-sectional area than second terminal piece.

9. A starter-use electromagnetic switch including a first solenoid having a first excitation coil for pushing out a pinion of a starter toward a ring gear of an engine using an attraction force of a first electromagnet implemented by the first excitation coil, and a second solenoid having a main contact interposed in a power supply line for supplying power from a battery to a motor of a starter and a second excitation coil for interrupting a current supplied to the motor through the power supply line by opening and closing the main contact in interlock with an on/off state of a second electromagnet implemented by the second excitation coil, comprising:

a first connection fitting electrically connected to the first excitation coil at one end thereof, and drawn outside through the resin cover at the other end thereof;

a second connection fitting electrically connected to the second excitation coil at one end thereof, and drawn outside through a resin cover of the starter-use electromagnetic switch at the other end thereof;

a first terminal fitting electrically and mechanically connected to the other end of the first connection fitting at one end thereof, the other end thereof serving as a first excitation coil supplied with power from the battery through a power feed line; and a second terminal fitting electrically and mechanically connected to the other end of the second fitting, and branched into first and second terminal pieces at the other end thereof, the first terminal piece serving as a second excitation terminal supplied with power from the battery through the power feed line, the second terminal piece serving as a connection terminal electrically connected through a cable to an excitation terminal of an auxiliary electromagnetic switch for suppressing a starting current flowing to the motor when the main contact is closed.

10. The starter-use electromagnetic switch according to claim 9, wherein the first and second terminal fittings are insert-molded in a terminal fixing block integrally formed with the resin cover, the first and second terminal pieces projecting in different directions from the terminal fixing block.

11. The starter-use electromagnetic switch according to claim 10, wherein a common connector housing is integrally foamed with the terminal fixing block around the first excitation coil and the first terminal piece, and a dedicated connector housing is integrally formed with the terminal fixing block around the second terminal piece.

12. The starter-use electromagnetic switch according to claim 11, wherein the first and second terminal pieces project in opposite directions with respect to an axial direction of the starter from the terminal fixing block, and the common connector housing and the dedicated connector housing at least partially overlap with each other in outer contour when viewed from the axial direction.

13. The starter-use electromagnetic switch according to claim 9, wherein the second terminal fitting is formed by pressing a metal plate.

14. The starter-use electromagnetic switch according to claim 9, wherein the second terminal fitting is larger in cross-sectional area than the first terminal fitting.

* * * * *